United States Patent [19]

Yokota et al.

[11] Patent Number: 4,632,968
[45] Date of Patent: Dec. 30, 1986

[54] CONTACT LENS AND PROCESS FOR PREPARATION THEREOF

[75] Inventors: Mitsuru Yokota; Tsutomu Goshima; Shuji Fujioka, all of Otsu, Japan

[73] Assignee: Toray Industries, Inc., Tokyo, Japan

[21] Appl. No.: 776,203

[22] PCT Filed: Jan. 11, 1985

[86] PCT No.: PCT/JP85/00009
§ 371 Date: Sep. 3, 1985
§ 102(e) Date: Sep. 3, 1985

[87] PCT Pub. No.: WO85/03138
PCT Pub. Date: Jul. 18, 1985

[30] Foreign Application Priority Data

Jan. 11, 1984 [JP] Japan .................................. 59-2031

[51] Int. Cl.$^4$ .............................................. C08F 30/08
[52] U.S. Cl. ................................ 526/279; 351/160 R; 351/160 H; 264/1.1; 528/26; 528/32
[58] Field of Search ...................... 351/160 R, 160 H; 264/1.1; 526/279; 528/32, 26

[56] References Cited

U.S. PATENT DOCUMENTS 4,136,250  1/1979  Mueller et al. .................... 528/29
4,259,467  3/1981  Keogh et al. .................. 351/160 R
4,327,203  4/1982  Deichert et al. ............... 351/160 H

*Primary Examiner*—Melvyn I. Marquis
*Attorney, Agent, or Firm*—Austin R. Miller

[57] ABSTRACT

An oxygen-permeable contact lens consisting essentially of a polymer having an organic polysiloxane skeleton and a three-dimensional crosslinked structure, and a process for the preparation thereof. The polymer comprises structural units comprising (A) a residue of a trifunctional isocyanate, (B) a residue of at least one compound selected from the group consisting of unsaturated carboxylic acids, monoalkyl esters of unsaturated dicarboxylic acid, monoalkyl and dialkyl esters of unsaturated tricarboxylic acids, hydroxyalkyl esters of unsaturated carboxylic acids, acrylamide, methacrylamide, vinyl ethers, and styrene derivatives having an active hydrogen atom, (C) a polydimethylsiloxane residue modified with an active hydrogen-containing functional group, and (D) a residue of at least one compound selected from the group consisting of alkyl esters of acrylic acid, alkyl esters of methacrylic acid, fluorine-containing acrylates, fluorine-containing methacrylates, acrylates and methacrylates having an alicyclic hydrocarbon group, aryl acrylates and methacrylates, halogen-containing aryl acrylates and methacrylates, styrene, styrene derivatives, alkyl esters of unsaturated carboxylic acids.

8 Claims, No Drawings

CONTACT LENS AND PROCESS FOR PREPARATION THEREOF

TECHNICAL FIELD

The present invention relates to a hard contact lens excellent in the oxygen permeability and the mechanical properties

BACKGROUND ART

As the contact lens, there have been mainly used hard contact lenses composed mainly of poly(methyl methacrylate) and soft contact lenses obtained by polymerizing a hydrophilic monomer such as 2-hydroxyethyl methacrylate or N-vinylpyrrolidone.

However, it has been found that these materials involve problems as described below. More specifically, a hard contact lens composed mainly of poly(methyl methacrylate) is excellent in the mechanical strength, the transparency and the astigmatism-correcting capacity, but it is defective in that it has no substantial oxygen permeability and the wearing time is limited because of a feeling of a foreign substance.

A soft contact lens formed by using a hydrogel (see, for example, U.S. Pat. No. 4,136,250) is characterized in that it has an oxygen permeability and since it is soft, a feeling of foreign substance is not given during wearing, but it is more readily broken than a hard contact lens and since components of tear adhere to the soft contact lens, it should be periodically washed. Furthermore, since the soft contact lens contains water, it should be sterilized.

Recently development of an oxygen-permeable hard contact lens having merits of both the conventional hard and soft contact lenses has been tried. For example, such a hard contact lens is disclosed in U.S. Pat. No. 4,327,203. A silicone-type polymer is well-known as an oxygen-permeable material. However, this polymer involves the following problems. In the first place, since the polymer is poor in mechanical properties, a contact lens prepared from this polymer is readily broken. In the second place, since the polymer is water-repellent, if a contact lens of this polymer is worn, no tear layer is formed between the cornea and the contact lens, a feeling of a foreign substance is given to a wearer and adhesion of the contact lens to the cornea is caused.

As means for solving these problems involved in the silicone-type polymer, there has been adopted, for example, copolymerization with a monomer giving a polymer having a hign glass transition temperature or graft copolymerization of a hydrophilic monomer to the surface. However, it has been difficult to simultaneously attain a high oxygen permeability and good performances required for a hard contact lens, such as high strength, mechanical processability, surface water wettability and transparency. Namely, if the oxygen permeability is improved, the strength or surface water wettability is reduced, and if the strength is improved, the oxygen permeability is reduced.

As the prior art closest to the present invention, there can be mentioned Japanese Patent Application No. 58-190617 (U.S. patent application Ser. No. 433,743 filed on Oct. 12, 1982). However, this prior art is still insufficient in some points. For example, if a diisocyanate compound is used, the number of urethane bonds is small and the elasticity is poor. Furthermore, if a triisocyanate compound is used, gelation is readily caused at the step of synthesizing a polysiloxane macromer and copolymerization with a water-soluble monomer or a water-insoluble monomer is impossible, and a stable polymer cannot be obtained.

DESCRIPTION OF THE INVENTION

It is a primary object of the present invention to provide a novel contact lens which is excellent in the oxygen permeability and is satisfactory in the properties required for a hard contact lens, such as elasticity, strength, mechanical processability, dimension stability, transparency, surface water wettability and oxygen permeability.

(1) In accordance with one aspect of the present invention, this object can be attained by an oxygen-permeable contact lens consisting essentially of a polymer having an organic polysiloxane skeleton and a three-dimensional crosslinked structure, said polymer comprising structural units comprising (A) a residue represented by the following formula:

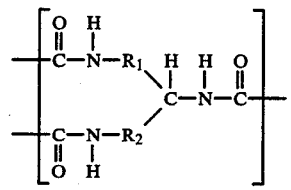

wherein $R_1$ and $R_2$ each stand for an organic residue, (B) a residue of at least one compound selected from the group consisting of unsaturated carboxylic acids, monoalkyl esters of unsaturated dicarboxylic acids, monoalkyl and dialkyl esters of unsaturated tricarboxylic acid, hydroxyalkyl esters of unsaturated carboxylic acids, acrylamide, methacrylamide, vinyl ethers, and styrene derivative having an active hydrogen atom, (C) a polydimethylsiloxane residue modified with an active hydrogen-containing functional group, which is represented by the following general formula:

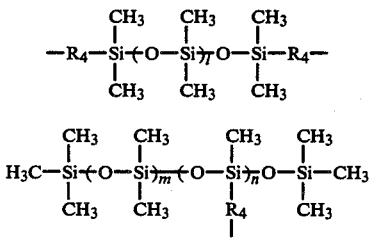

wherein l and m stand for an integer of 0 to 200, n is an integer of 1 to 200, and $R_4$ stands for

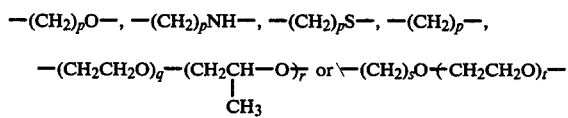

(in which p is an integer of 1 to 30, q and r stand for an integer of 0 to 30, s is an integer of 1 to 25 and t is an integer of 0 to 30), and (D) a residue of at least one compound selected from the group consisting of alkyl esters of acrylic acid, alkyl esters of methacrylic acid, fluorine-containing acrylates, fluorine-containing methacrylates, acrylates and methacrylates having an alicyclic hydrocarbon group, aryl acrylates and methacrylates, halogen-containing aryl acrylates and methacrylates, styrene, styrene derivatives, dialkyl esters of unsaturated dicarboxylic acids and trialkyl esters of unsaturated tricarboxylic acids.

(2) In accordance with another aspect of the present invention, there is provided a process for the preparation of a contact lens, which comprises reacting (A) 1 to 40% by weight of a trifunctional isocyanate represented by the following formula:

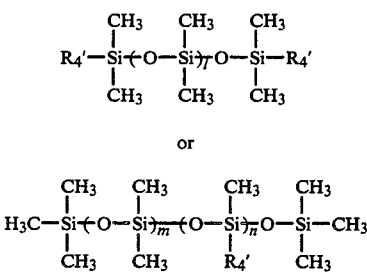

wherein $R_1$ and $R_2$ each stand for an organic residue, (B) 1 to 40% by weight of a monomer having a polymerizable double bond and an active hydrogen atom, (C) 20 to 80% by weight of a polydimethylsiloxane modified with an active hydrogen-containing functional group, which is represented by the following general formula:

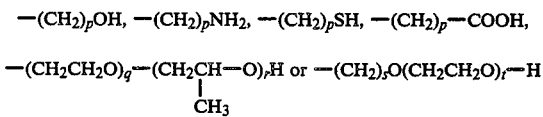

wherein l and m stand for an integer of 0 to 200, n is an integer of 1 to 200, and $R_4'$ stands for $$-(CH_2)_pOH, -(CH_2)_pNH_2, -(CH_2)_pSH, -(CH_2)_p-COOH,$$

$$-(CH_2CH_2O)_q-(CH_2CH-O)_rH \text{ or } -(CH_2)_sO(CH_2CH_2O)_t-H$$
$$\qquad\qquad\qquad |$$
$$\qquad\qquad\qquad CH_3$$

(in which p is an integer of 1 to 30, q and r stand for an integer of 0 to 30, s is an integer of 1 to 25 and t is an integer 0 to 30), and (D) 20 to 80% by weight of hydrophobic monomer, and forming a contact lens from the reaction product.

PREFERRED EMBODIMENTS FOR THE PRACTICE OF THE INVENTION

In the present invention, the unit (A) connects the organic polyslloxane skeleton to the skeleton consisting of the residue of the compound (D) through the unit (B), and the unit (A) imparts an excellent elasticity to the contact lens of the present invention through the urethane and amide linkages thereof. The unit (A) has three

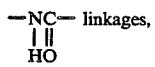

and since one of these linkages is directly bonded to the carbon atom without an intervening organic group such as $R_1$ or $R_2$, the compound residues bonded to these three

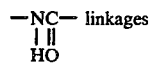

can be controlled relatively easily. For example, the contact lens of the present invention may have the following skeleton as the main unit:

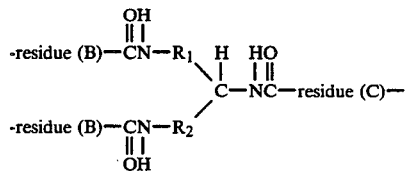

These skeleton components may be analyzed by GC-MS residue of the thermal decomposition gas or infrared spectrometric analysis of the thermal decomposition residue.

Advantageously, the contact lens of the present invention has an oxygen permeability of at least $5 \times 10^{-10}$ ml·cm/cm²·sec·cmHg. This contact lens can be worn for a long time of period.

In order to facilitate understanding of the present invention, the preparation process of the present invention will first be described.

In the process of the present invention, the trifunctional isocyanate (A) reacts with a monomer having a polymerizable double bond and an active hydrogen atom and a polydimethylsiloxane modified with a functional group having an active hydrogen atom to introduce the polymerizable double bond into both the terminals or the side chains of the modified polydimethylsiloxane so that copolymerization with a hydrophobic monomer (D) becomes possible. As the trifunctional isocyanate to be used in the present invention, there can be mentioned triisocyanates derived from lysine, represented by 2,6-diisocyanatocaproic acid-β-isocyanatoethyl ester, and 1,6,11-undecane triisocyanate.

The characteristic feature of the trifunctional isoyanates is that at least one -NCO group is bound to the carbon atom of the branching point, through no organic residue such as $R_1$ or $R_2$, as represented by

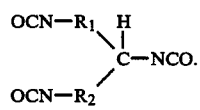

The reason why these trifunctional isocyanates are used is that gelation is prevented or controlled at the stage of the monomer or prepolymer.

2,6-Diisocyanato-caproic acid-β-isocyanato-ethyl ester or 1,6,11-undecane triisocyanate is especially preferably used in the present invention.

As pointed out hereinbefore, the monomer (B) having a polymerizable double bond and an active hydrogen atom is used so as to introduce the polymerizable double bond into both the terminals or the side chains of the modified polydimethylsiloxane. As examples of the monomer (B), the following compounds can be mentioned.

(1) Hydroxylalkyl esters of unsaturated carboxylic acid such as acrylic acid, methacrylic acid, maleic acid, fumaric acid and itaconic acid.

(2) Unsaturated carboxylic acids such as acrylic acid, methacrylic acid, maleic acid, fumaric acid and itaconic acid.

(3) Mono- and di-alkyl esters of unsaturated di- and tri-carboxylic acids such as maleic acid, fumaric acid and itaconic acid.

(4) Acrylamide and methacrylamide.

(5) Vinyl ethers such as hydroxyalkyl vinyl ethers and aminoalkyl vinyl ethers.

(6) Styrene derivatives such as aminostyrene and hydroxystyrene.

The polydimethylsiloxane (C) modified with a functional group having an active hydrogen atom is used so as to impart an oxygen permeability to the contact lens of the present invention. For example, the following compounds can be used as the component (C).

(2) Esters of acrylic and methacrylic acids with fluorine-containing alcohols, such as trifluoroethyl methacrylate.

(3) Polycyclic esters of acrylic and methacrylic acids such as isobornyl acrylate, isobornyl methacrylate, adamantanyl acrylate and adamantanyl methacrylate.

(4) Phenyl esters of acrylic and methacrylic acids such as phenyl acrylate, phenyl methacrylate, pentachlorophenyl acrylate, pentachlorophenyl methacrylate, pentafluorophenyl acrylate and pentafluorophenyl methacrylate.

(5) Styrene and styrene derivatives such as dichlorostyrene and pentafluorostyrene.

(6) Di- and tri-alkyl esters of unsaturated di- and tri-carboxylic acids such as dimethyl itaconate and dimethyl maleate.

These monomers may be used singly or in the form of a mixture of two or more of them.

The proportions of the amounts used of the compo-

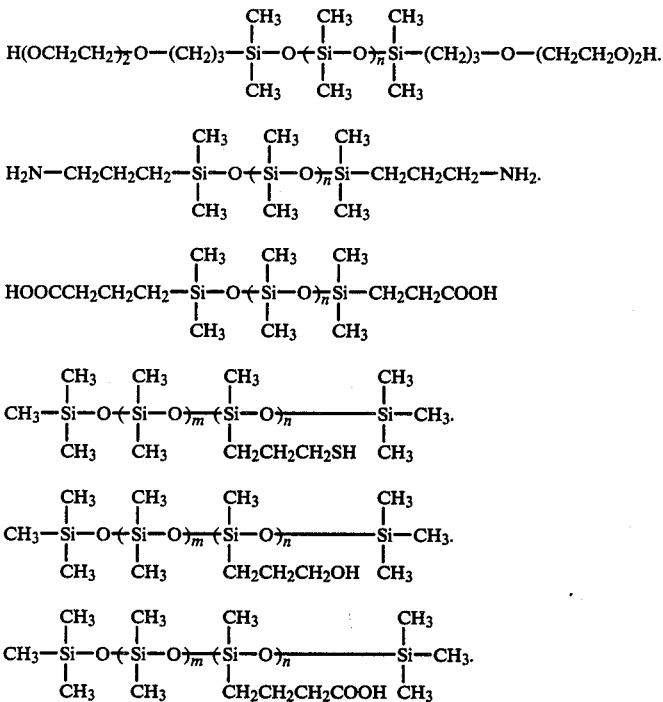

It is preferred that the mixing ratio of the components (A), (B) and (C) be such that the ratio of the number of the isocyanate groups in the component (A)/the number of the active hydrogen-containing functional groups in the component (B)/the number of the active hydrogen-containing functional groups in the component (C) is in the range of from 3/2/1 to 3/1/2. The amount added of the component (B) may exceed the above-mentioned range. In this case, some of the component (B) is left unreacted with the isocyanate group to improve the water wettability of the surface of the contact lens of the present invention.

The hydrophobic monomer (D) is used as to impart a strength to the contact lens of the present invention. As the hydrophobic monomer (D) to be used in the present invention, the following compounds can be mentioned.

(1) Alkyl esters of acrylic and methacrylic acids such as methyl acrylate, methyl methacrylate and tert-butyl methacrylate.

nents (A), (B), (C) and (D) are 1 to 40% by weight of the component (A), 1 to 40% by weight of the component (B), 20 to 80% by weight of the component (C) and 20 to 80% by weight of the component (D). Since the ratio of the components (A), (B) and (C) is determined by the ratio of the numbers of the active hydrogen-containing functional groups and isocyanate groups as pointed out hereinbefore, the weights of the respective components differ according to the molecular weights thereof. For example, if the number of the functional groups in one molecule is constant, as the molecular weight of the component (C) is increased, the weight proportions of the components (A) and (B) are reduced, and as the molecular weight of the component (C) is reduced, the weight proportions of the components (A) and (B) are increased.

Although the above-mentioned relation is established among the amounts of the components (A), (B) and (C), it is preferred that the component (C) be used in an amount of 20 to 80% by weight. If the amount of the component (C) is smaller than 20% by weight, the oxygen permeability of the contact lens is drastically reduced, and if the amount of the component (C) is larger than 80% by weight, the mechanical properties of the contact lens as a hard contact lens are greatly reduced. As pointed out hereinbefore, the component (B) may be used in an amount larger than the amount calculated from the ratio of the functional groups among the components (A), (B) and (C).

The component (D) is preferably used in an amount of 20 to 80% by weight. If the amount of the component (D) is smaller than 20% by weight, the mechanical properties are degraded, and if the amount of the component (D) exceeds 80% by weight, the oxygen permeability of the contact lens is reduced.

In the present invention, a crosslinking agent may be used according to need. By the term "crosslinking agent" is meant a monomer having at least two polymerizable double bonds in the molecule, and the crosslinking agent is used in an amount of up to 20% by weight based on the sum of the components (A), (B), (C) and (D). An ordinary crosslinking agent customarily used for the production of a crosslinked polymer may be used. For example, there can be mentioned di- and tri-vinyl compounds such as ethylene glycol diacrylate, ethylene glycol dimethacrylate, diethylene glycol diacrylate, diethylene glycol dimethacrylate, triethylene gylcol dimethacrylate, polyethylene glycol diacrylate, polyethylene glycol dimethacrylate, hexamethylene-bis-maleimide, divinylbenzene, N,N'-methylene-bis-acrylamide, trimethylolpropane triacrylate, trimethylolpropane trimethacrylate and acrylic or methacrylic acid esters of tris(2-hydroxyethyl)isocyanuric acid, allyl compounds such as diallyl succinate, diethylene glycol bis-allylcarbonate and triallyl isocyanurate, allylvinyl compounds such as allyl acrylate and allyl methacrylate, and vinyl acrylate and vinyl methacrylate.

In the present invention, there may be adopted a method in which all the components are collectively charged and reacted, and a method in which the components (A), (B), and (C) are reacted in advance to synthesize a macromer and the macromer is copolymerized with the component (D). In the case where the macromer is synthesized in advance, it is preferred that the ratio of the number of the isocyanate groups in the component (A)/the number of the active hydrogen-containing functional groups in the component (B)/the number of the active hydrogen-containing functional groups in the component (C) be adjusted to 3/2/1. According to this preferred feature, it is possible to introduce two polymerizable double bonds into each of both the terminals or the respective side chains of the modified polydimethylsiloxane as the component (C). When this macromer is used, there also is preferably adopted a method in which the component (B) is further added to the macromer and the component (D) and is copolymerized therewith.

A tertiary amine such as triethylamine or an organic or inorganic metal compound such as cobalt naphthenate, stannous chloride, tetra-n-butyl tin, di-n-butyl tin dilaurate and stannic chloride may be used as a catalyst for the reaction between the isocyanate and the active hydrogen-containing functional group.

A polymerization initiator may be used for the polymerization reaction. Any of polymerization initiators customarily used for ordinary polymerizations may be used in the present invention. For example, there can be mentioned peroxides such as benzoyl peroxide, di-t-butyl peroxide, 2,4-dichlorobenzoyl peroxide, tert-butyl hydroperoxide and ammonium persulfate, and azo compounds such as azobisisobutyronitrile, azobiscyclohexanecarbonitrile and azobisdimethylvaleronitrile.

The foregoing starting materials are mixed and dissolved to form a homogeneous and transparent starting solution, and the starting solution is charged in a cavity having a desired shape. Then, the atmosphere is replaced by an inert gas such as nitrogen, and reaction is effected by the action of heat, light or radiation. After completion of the reaction, the obtained polymer is processed into the form of a contact lens.

INDUSTRIAL APPLICABILITY

The contact lens obtained according to the present invention has excellent properties and, thus, provides industrial advantages as described below.

(1) Since the content of urethane linkage is relatively high, the elasticity is excellent. For example, the elongation of the contact lens of the present invention is about 2 times as high as that of the contact lens disclosed in prior Japanese patent Application No. 58-190617 (corresponding to U.S. Patent application Ser. No. 433,743 filed on Oct. 12, 1982). Moreover, the flexural strength is highly improved.

(2) At least one of the organic groups bonded directly to the isocyanate group is different from the other organic groups and the reactivity of isocyanate group differs, and therefore, gelation is prevented at the prepolymer synthesis stage to stably produce a prepolymer, with a result that a lens having uniform composition and properties can be obtained.

(3) Since the modified polydimethylsiloxane having a high oxygen permeability is contained, the obtained contact lens is excellent in the oxygen permeability.

(4) Since the trifunctional isocyanate is used, sufficient crosslinking reaction is effected in the polymer consisting of the siloxane component and the hydrophobic monomer, and therefore, phase separation is hardly caused and the obtained lens has a high transparency.

(5) Since the trifunctional isocyanate is used, the monomer [component (B)] having a polymerizable double bond and an active hydrogen atom can be used in an amount larger than in the case where a difunctional isocyanate is used. Accordingly, if a monomer giving a polymer having a high glass transition temperature, such as 2-hydroxyethyl methacrylate, is used as the component (B), a contact lens excellent in the strength can be easily obtained.

The effects of the present invention will now be described in detail with reference to the following examples. In the examples, all of "parts" are by weight.

EXAMPLE 1

A homogeneous and transparent starting solution was prepared by mixing and dissolving 94.6 parts of polydimethylsiloxane having an average molecular weight of 946 and both the terminals modified with an alcohol, which was represented by

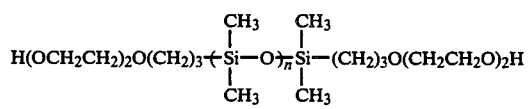

53.4 parts of 2,6-diisocyanato-caproic acid-β-isocyanatoethyl ester, 52 parts of 2-hydroxyethyl methacrylate, 60.7 parts of methyl methacrylate, 1.1 parts of trimethylolpropane trimethacrylate, 0.08 part of azobisdimethylvaleronitrile and 0.02 part of di-n-butyl tin dilaurate. This solution was charged in a test tube composed of polypropylene, and the inside atmosphere was replaced by nitrogen and the test tube was plugged. The reaction was carried out at 40° C. for 40 hours, at 50° C. for 24 hours, at 60° C. for 16 hours, at 70° C. for 4 hours and at 90° C. for 2 hours. Furthermore, the reaction mixture was heated at 130° C. for 3 hours in a convection oven to obtain a colorless transparent rod-like polymer.

The obtained polymer had a Shore "D" hardness of 80, and it was hard and had good grinding and polishing properties. The polymer could be processed into the form of a contact lens conveniently. The oxygen permeability of the polymer was about $20 \times 10^{-10}$ ml·cm/cm$^2$·sec·cmHg as measured at 37° C. by using a Seikaken-type film oxygen permeation meter. This oxygen permeability is several hundred times as high as that of poly(methyl methacrylate) customarily used for a hard contact lens. When the contact angle, which is a factor indicating the water repellency which is a problem of a silicone type material, was measured, it was found that the contact angle of the polymer was 28° and the problem of the water repellency was not brought about in this polymer.

EXAMPLES 2 through 5

A four-neck flask provided with a stirrer, a thermometer, a refluxcooler and a nitrogen gasintroducing inlet was charged with 53.4 parts of 2,6-diisocyanato-caproic acid-β-isocyanato-ethyl ester, 52 parts of 2-hydroxyethyl methacrylate and 0.01 di-n-butyl tin dilaurate, and the mixture was stirred at 50° C. in a nitrogen atmosphere until the absorption attributed to the hydroxyl group disappeared in the infrared absorption spectrum. Then, 94.6 parts of the same polydimethylsiloxane having an average molecular weight of 946 and both the terminals modified with an alcohol as used in Example 1 was added into the four-neck flask, and the mixture was stirred at 50° C. in a nitrogen atmosphere until the absorption attributed to the isocyanate group disappeared in the infrared absorpiton spectrum, whereby a reaction product containing as the main component a siloxane macromer having two double bonds on each of both the terminals was obtained.

This reaction product was divided into small parts, and 3 parts of methyl methacrylate, trifluoroethyl methacrylate, tert-butyl methacrylate or isobornyl methacrylate was added to 10 parts of the macromer. Then, 0.055 part of trimethylolpropane trimethacrylate and 0.004 part of azobisdimethylvaleronitrile were added to the mixture. A homogeneous and transparent starting solution was formed from the mixture by mixing and dissolution, and the polymerization was carried out in the same manner as described in Example 1 to obtain a transparent rod-like polymer.

The properties of the polymers obtained according to the above procedures are shown in Table 1. Each polymer could be ground and polished and was excellent in the mechanical processability.

TABLE 1

| Example No. | Composition (parts) | | Trimethylolpropane Trimethacrylate | Shore "D" Hardness | Oxygen Permeability (ml · cm/cm$^2$ · sec · cm Hg) |
| --- | --- | --- | --- | --- | --- |
| | Siloxane Macromer | Monomer | | | |
| 2 | 10 | methyl methacrylate, 3 | 0.055 | 80 | $20 \times 10^{-10}$ |
| 3 | 10 | trifluoroethyl methacrylate, 3 | 0.055 | 74 | $32 \times 10^{-10}$ |
| 4 | 10 | tert-butyl methacrylate, 3 | 0.055 | 75 | $24 \times 10^{-10}$ |
| 5 | 10 | isobornyl methacrylate, 3 | 0.055 | 78 | $21 \times 10^{-10}$ |

EXAMPLE 6

In the same manner as described in Example 2, a siloxane macromer was synthesized by using 340 parts of polydimethysiloxane having an average molecular weight of 3400 and both the terminals modified with an alcohol, which was represented by the formula of Example 1, 53.4 parts of 2,6-diisocyanato-caproic acid-β-isocyanato-ethyl ester and 52 parts of 2-hydroxyethyl methacrylate.

To 10 parts of this siloxane macromer were added 12 parts of methyl methacrylate and 0.13 part of a methacrylic acid ester of tris(2-hydroxyethyl)isocyanuric acid, and the composition was sufficiently mixed and charged in a test tube composed of polypropylene. The inside atmosphere was replaced by nitrogen and the test tube was plugged. The composition was irradiated with γ-rays from $^{60}$Co at 1 Mrad to obtain a transparent rod-like polymer.

The Shore "D" hardness of this polymer was 73, and the polymer could be ground and polished and had a good mechanical processability. The oxygen permeability at 37° C. of the polymer was as high as about $40 \times 10^{-10}$ ml·cm/cm$^2$·sec·cmHg.

EXAMPLE 7

In the same manner as described in Example 2, 52 parts of 2-hydroxyethyl methacrylate was reacted with 53.4 parts of 2,6-diisocyanato-caproic acid-β-isocyanatoethyl ester, and 303 parts of polydimethylsiloxane having an average molecular weight of 3030 and both the terminals amino-modified, which was represented by the following formula:

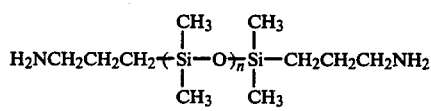

was added to the reaction mixture and a siloxane macromer was synthesized.

To 10 parts of this macromer were added 12 parts of methyl methacrylate, 0.12 part of divinylbenzene and 0.005 part of azobisisobutyronitrile, and polymerization was carried out in the same manner as described in Example 1 to obtain a rod-like polymer. The Shore "D" hardness of the polymer was 74 and the polymer could be ground and polished. The oxygen permeability at 37° C. of the polymer was about $35 \times 10^{-10}$ ml·cm/cm²·sec·cmHg. Thus, it was confirmed that the polymer had properties suitable for an oxygen-permeable hard contact lens.

We claim:

1. An oxygen-permeable contact lens consisting essentially of a polymer having an organic polysiloxane skeleton and a three-dimensional crosslinked structure, said polymer comprising structural units comprising (A) a residue represented by the following formula:

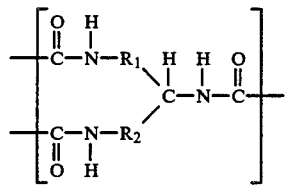

wherein $R_1$ and $R_2$ each stand for an organic residue, (B) a residue connected to residue (A) comprising at least one compound selected from the group consisting of unsaturated carboxylic acids, monoalkyl esters of unsaturated dicarboxylic acids, monoalkyl and dialkyl esters of unsaturated tricarboxylic acids, hydroxyalkyl esters of unsaturated carboxylic acids, acrylamide, methacrylamide, vinyl ethers, and styrene derivatives having an active hydrogen atom, (C) a polydimethylsiloxane residue connected to residue (A) modified with an active hydrogen-containing functional group, which is represented by the following general formula:

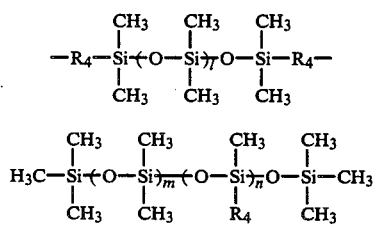

wherein l and m stand for an integer of 0 to 200, n is an integer of 1 to 200, and $R_4$ stands for

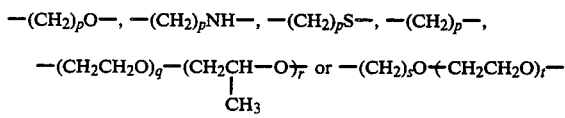

in which p is an integer of 1 to 30, q and r stand for an integer of 0 to 30, s is an integer of 1 to 25 and t is an integer of 0 to 30,
copolymerized with (D) a residue of at least one compound selected from the group consisting of alkyl esters of acrylic acid, alkyl esters of methacrylic acid, fluorine-containing acrylates, fluorine-containing methacrylates, acrylates and methacrylates having an alicyclic hydrocarbon group, aryl acrylates and methacrylates, halogen-containing aryl acrylates and methacrylates, styrene, styrene derivatives, dialkyl esters of unsaturated dicarboxylic acids and trialkyl esters of tricarboxylic acids wherein unit (A) connects an organic polysiloxane skeleton to a skeleton consisting of the residue of unit (D) through unit (B).

2. A contact lens as set forth in claim 1, having an oxygen permeability of at least $5 \times 10^{-10}$ ml·cm/cm²·sec·cmHg.

3. A contact lens as set forth in claim 1, wherein the component (A) is a residue of a β-isocyanato-alkyl ester of 2,6-diisocyanato-caproic acid or 1,6,11-undecane triisocyanate.

4. A process for the preparation of a contact lens, which comprises addition reacting (A) 1 to 40% by weight of a trifunctional isocyanate represented by the following formula:

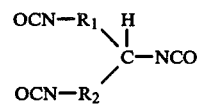

wherein $R_1$ and $R_2$ each stand for an organic residue, (B) 1 to 40% by weight of a monomer having a polymerizable double bond and an active hydrogen atom, (C) 20 to 80% by weight of a polydimethylsiloxane modified with an active hydrogen-containing functional group, which is represented by the following general formula:

$$\begin{array}{ccc} CH_3 & CH_3 & CH_3 \\ | & | & | \\ R_4'-Si(O-Si)_lO-Si-R_4' \\ | & | & | \\ CH_3 & CH_3 & CH_3 \end{array}$$

$$\begin{array}{cccc} CH_3CH_3 & CH_3 & CH_3 \\ | \ | & | & | \\ H_3C-Si(O-Si)_m(O-Si)_nO-Si-CH_3 \\ | \ | & | & | \\ CH_3CH_3 & R_4' & CH_3 \end{array}$$

wherein l an m stand for an integer of 0 to 200, n is an integer of 1 to 200, and $R_4'$ stands for $-(CH_2)_pOH, -(CH_2)_pNH_2, -(CH_2)_pSH, -(CH_2)_p-COOH,$ $-(CH_2CH_2O)_q-(CH_2CH-O)_rH$ or $-(CH_2)_sO(CH_2CH_2O)_t-H$
$\quad\quad\quad\quad\quad\quad\quad |$
$\quad\quad\quad\quad\quad\quad CH_3$ in which p is an integer of 1 to 30, q and r stand for an integer of 0 to 30, s is an integer of 1 to 25 and t is an integer of 0 to 30;
and (D) 20 to 80% by weight of a hydrophobic monomer having a polymerizable double bond and having no active hydrogen atom; wherein components (A), (B), and (C) undergo an addition reaction and components (B) and (D) undergo a vinyl polymerization; and forming a contact lens from the reaction product.

5. A process according to claim 4, wherein a crosslinking agent which is a monomer having at least two polymerizable double bonds in the molecule is added.

6. A process according to claim 4, wherein the mixing ratio of the components (A), (B) and (C) is such that the ratio of the number of isocyanate groups in the component (A)/the number of active hydrogen-containing functional groups in the component (B)/the number of active hydrogen-containing functional groups in the component (C) is in the range of from 3/2/1 to 3/1/2.

7. A process according to claim 4, wherein the number of active hydrogen-containing functional groups in the component (B) is at least 2/6 of the sum of the number of isocyanate groups in the component (A), the number of active hydrogen-containing functional groups in the component (B) and the number of active hydrogen-containing functional groups in the component (C).

8. A process according to claim 4, wherein the contact lens is obtained by grinding and polishing.

* * * * *